United States Patent [19]

Hattori et al.

[11] Patent Number: 4,975,232
[45] Date of Patent: Dec. 4, 1990

[54] PROCESS FOR PRODUCING FIBER REINFORCED PLASTICS LINEAR MATERIALS

[75] Inventors: Masaaki Hattori; Mitsuharu Komada; Hario Ioka; Yasuo Yamamoto, all of Osaka, Japan

[73] Assignee: Nitto Denko Corporation, Osaka, Japan

[21] Appl. No.: 231,914

[22] PCT Filed: Dec. 10, 1987

[86] PCT No.: PCT/JP87/00960
§ 371 Date: Oct. 11, 1988
§ 102(e) Date: Oct. 11, 1988

[87] PCT Pub. No.: WO88/04230
PCT Pub. Date: Jun. 16, 1988

[30] Foreign Application Priority Data

Dec. 11, 1986 [JP] Japan .................. 61-296193

[51] Int. Cl.$^5$ .................. B29C 47/02; B29C 53/14
[52] U.S. Cl. .................. 264/137; 156/148; 264/1.5; 264/174; 264/295; 427/434.6
[58] Field of Search ............. 264/1.5, 167, 174, 137, 264/295, 339; 427/163, 434.6, 434.7; 156/148

[56] References Cited

U.S. PATENT DOCUMENTS

| | | | |
|---|---|---|---|
| 4,205,899 | 6/1980 | King et al. | 264/1.5 |
| 4,269,024 | 5/1981 | Ashpole | 264/1.5 |
| 4,474,426 | 10/1984 | Yataki | 264/1.5 |
| 4,645,628 | 2/1987 | Hill | 264/1.5 |
| 4,661,406 | 4/1987 | Gruhn et al. | 428/397 |
| 4,673,540 | 6/1987 | Portinari | 264/174 |
| 4,814,133 | 3/1989 | Matsuno et al. | 264/1.5 |

FOREIGN PATENT DOCUMENTS 3145153 6/1983 Fed. Rep. of Germany ...... 264/167

Primary Examiner—James Lowe
Attorney, Agent, or Firm—Sughrue, Mion, Zinn, Macpeak & Seas

[57] ABSTRACT

Process for producing a fiber reinforced plastics linear material like a tension member for optical communication cables. A groove capable of accomodating an optical fiber is formed in the outer surface of the tension member. In accordance with the conventional method, the groove is necessarily formed in parallel along the axial direction of the tension member and, therefore, if the tension member is bent in the state that the optical fiber is placed in the groove, a force due to bending is applied directly to the optical fiber and the transmission loss of the optical fiber is increased. In accordance with the present invention, a tension member for optical communication cables in which groove is twisted in the spiral form relative to the axial direction of the groove is produced by (1) passing a resin impregnated glass fiber through a molding die heated and then passing it through a curing zone while applying a twisting force, or (2) after completely curing the resin, passing through a heating zone independently provided and during this passage, applying a twisting force. Even if this tension member is bent in the state that an optical fiber is placed in the groove, almost no twisting force is applied to the optical fiber.

12 Claims, 3 Drawing Sheets

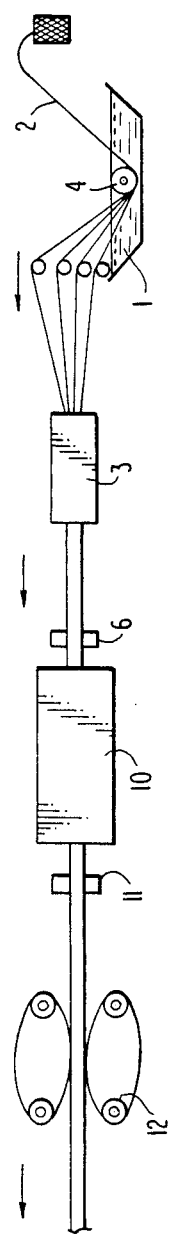
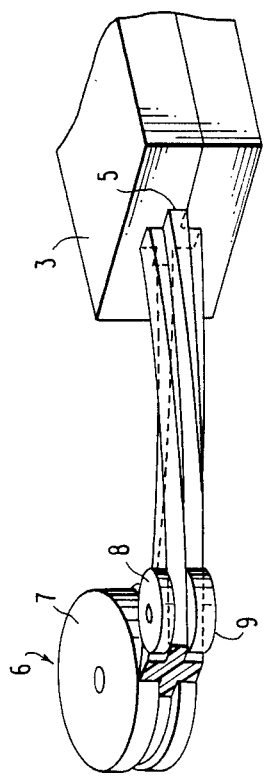
FIG.1
FIG.3
FIG.2

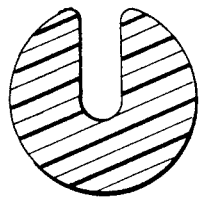
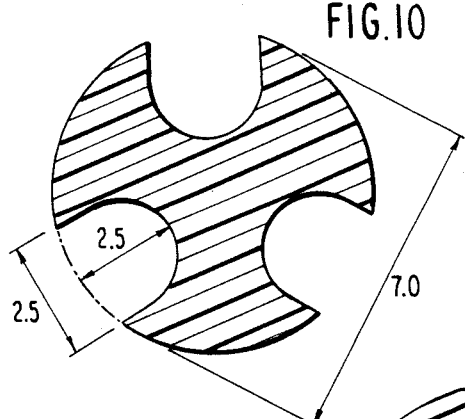
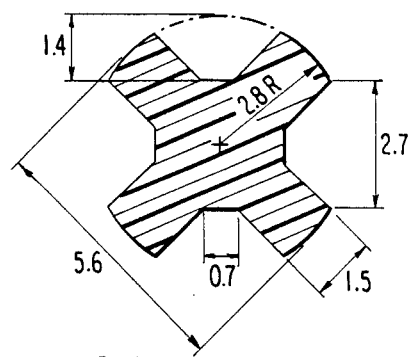
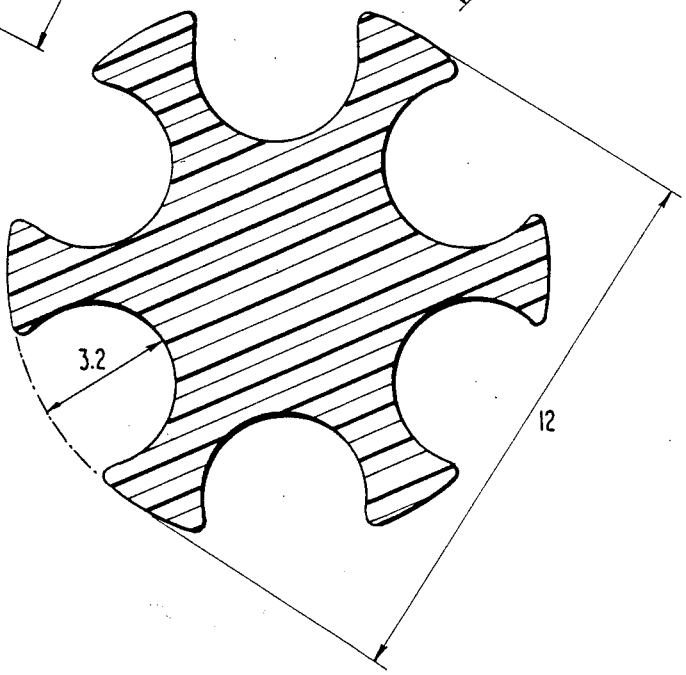

PROCESS FOR PRODUCING FIBER REINFORCED PLASTICS LINEAR MATERIALS

TECHNICAL FIELD

The present invention relates to a process for producing fiber reinforced plastics linear materials subjected to twisting in the circumferential direction.

BACKGROUND OF ART

In general, fiber reinforced plastic linear materials such as a glass fiber reinforced plastic linear material and the like are formed in a bar form or the like by impregnating reinforcing fiber such as glass fiber and the like with a resin, forcedly passing (introducing) it through a heated molding die, and pultruding it from the other end.

The linear material thus formed has excellent tensile strength because the reinforcing fiber is oriented in the lengthwise direction and is suitably used as a high tensile material. In particular, in the linear material as described above, a groove capable of accommodating an optical fiber can be formed continuously in the lengthwise direction on the outer surface thereof by appropriately modifying the cross-sectional shape of the molding die, the linear material has excellent tensile properties, and also the linear material can be formed in a long form. Therefore, the linear material is suitable as a tension member (tensile material) for optical communication cables.

However, since, as described above, the above linear material is formed by the continuous pultruding molding method, the groove accommodating the optical fiber is formed in parallel along the axial direction of the linear material. In a cable in which an optical fiber is placed in the groove provided in parallel along the axial direction, when the cable is bent, the optical fiber on the compression side is subject to compression force, and tensile force is applied to the optical fiber on the tensile side. Since the above compression force and tensile force increase the transmission loss of the optical fiber, it is preferred in order to avoid the above forces that the groove accommodating the optical fiber be twisted in a spiral in the axial direction so that the optical fiber placed in the groove is also twisted in a spiral. In accordance with the conventional continuous pultruding molding method for production of fiber reinforced plastic linear materials, since high tensile force is applied in the lengthwise direction of the linear material, it has been considered impossible to twist the grove in the axial direction of the linear material. For this reason, a tension member having a groove twisted in the spiral form relative to the axial direction of the linear material was formed a differently shaped rod of aluminum or an extruded product of a thermoplastic resin. A differently shaped rod of aluminum has a disadvantage in insulating properties and the thermoplastic resin extruded product has a disadvantage in heat resistance and strength. Thus, neither one performs satisfactorily as a tension member for optical communication cable.

The present invention has been made in view of the above circumstances, and its object is to provide a process for producing fiber reinforced plastic linear materials having high strength and excellent characteristics such as heat resistance and the like. In accordance with the present invention, fiber reinforced plastic linear materials having the groove twisted in the spiral form relative to the axial direction of the linear material can be obtained continuously.

DISCLOSURE OF THE INVENTION

The above object is achieved process for producing fiber reinforced plastic linear materials in which a reinforcing fiber is continuously moved in the lengthwise direction, impregnated with a resin, passed through a molding die while heating to yield the groove(s) and semi-cure the resin, and heated in a resin curing zone while a twisting force is simultaneously applied through the grooves to cure the resin with the grooves in a spiral form relative to the axial direction of the resin impregnated reinforcing fiber (the first gist of the invention). The second gist of the invention achieves the object of the invention by a process in which a reinforcing fiber is moved, impregnated and passed through a molding die as above, heated until completely cured, passed through a heating zone and maintained at a temperature of not less than the glass transition temperature (Tg) of the resin cured material and twisting force is simultaneously applied through the grooves to position the grooves in the cured resin in a spiral form relative to the axial direction of the resin impregnated reinforcing fiber.

The above second gist includes a technique in which the resin impregnated fiber substrate enters the heating zone completely cured. The heating zone is at a temperature of not less than the glass transition temperature and this permits twisting force to be successfully applied to the cured resin impregnated fiber.

That is, the present inventors made a series of investigations to improve a process for producing fiber reinforced plastic linear material by the continuous pultruding molding method, and to obtain linear materials having a groove in the spiral form in the axial direction by applying a twisting treatment to form spirally grooved fiber reinforced plastic linear materials without damaging the reinforcing fiber. As a result, they found that the above object can be attained with a twisted fiber reinforced linear material produced by passing a resin impregnated reinforcing fiber through a molding die to bring the resin to a semi-cured state, applying a twisting force to the grooved material, and passing the grooved material through a resin curing zone to completely cure the resin. The present inventors made further investigations and, as a result, they found that if the resin of the resin impregnated reinforcing fiber as described above is completely cured without application of twisting force that the above object can be attained by passing the grooved material described above through the heating zone while applying twisting force to the grooved material at a temperature of not less than the glass transition temperature of the completely cured material. In particular, the latter method yields a product having improved surface smoothness.

Resins useful in the present invention are thermosetting resins such as unsaturated polyester resins, epoxy resins, vinyl ester resins and the like are mentioned. Usually these are mixed with a curing agent, a curing accelerating agent and the like, and used as a liquid composition.

As reinforcing fibers, inorganic fibers such as glass fibers, carbon fibers, metal fibers, organic fibers such as aramide fibers, and the like can be used. These can be used alone or as mixtures thereof.

In continuously producing a fiber reinforced plastic linear material using the above raw materials, in the method of the first gist, twisting treatment is applied, for example, by directing the resin impregnated reinforcing fiber to a twisting jig at a suitable stage during its passage through the heated molding die to the curing zone, and in such a case it is important that the resin of the resin impregnated reinforcing fiber to be subjected to twisting treatment is in a semi-cured state. If the above resin is not in the semi-cured state, but rather in a cured state, the twisted state is released until it reaches the curing zone even if the twisting treatment is applied by passing through the twisting jig, and a fiber reinforced plastic linear material is not subjected to twisting treatment is obtained. As the twisting jig, a jig in a molding die form can be used. A roller-like jig may also be used in combination with a twisting jib. By rotating a pulling apparatus during the pultruding molding the pulling apparatus acts as a twisting jig and eliminates the necessity of a special jig. In summary, no limitations are applied to the twisting means so long as it permits continuous or intermittent twisting of the grooved resin impregnated reinforcing fiber.

The "semi-cured state" is a term commonly used in the art and can be easily understood by one skilled in the art. For reference, the "semi-cured state" as used herein means the state at which a state) resin impregnated fiber after passing a molding die and being subjected to external force (from a jib, for example) can maintain self-retention properties. In general, the flexural strength of the fiber reinforced plastic linear material is about 80% or less of the flexural strength of the completely cured fiber reinforced plastics linear material.

The method of the second gist is a method in which the twisting is not applied as the semi-cured material passes from the molding die to the curing zone as in the aforementioned method, but rather the twisting force is applied after completely curing the resin impregnated reinforcing fiber simultaneously at the time of molding with a molding die that is to say after bringing the material of the invention to the semi-cured and following molding and completely curing by passing the material through a heat curing furnace the material is passed through a heating zone (maintained at a temperature not lower than the glass transition temperature of the resin cured body and then passed through a twisting jig). That is, this method realizes deformation molding of the completely cured resin which has been considered impossible. In accordance with the method, the completely cured product can be set in a state that twisting force is applied, even after the material is in the completely cured state. In a case where the reinforcing fiber of the resin impregnated reinforcing fiber is an organic fiber and the melting point of the organic reinforcing fiber is lower than Tg of the completely cured product of the resin to be impregnated, twisting can be conducted in the circumferential direction according to the above method by setting the temperature of the above heating zone at a temperature not lower than the melting point of the reinforcing fiber.

BRIEF DESCRIPTION OF THE DRAWINGS

FIG. 1 is view of the state of production in one embodiment of the present invention; FIG. 2 is a perspective view of a part of FIG. 1; FIG. 3 is a partly broken perspective view of a fiber reinforced plastic linear material obtained thereby; FIG. 7 is a broken perspective view of another embodiment of the fiber reinforced plastics linear material; and FIGS. 8, 9, 10, 11 and 12 are each a sectional view of another embodiment of the fiber reinforced plastics linear material.

DETAILED DESCRIPTION OF THE INVENTION

Figure 4:
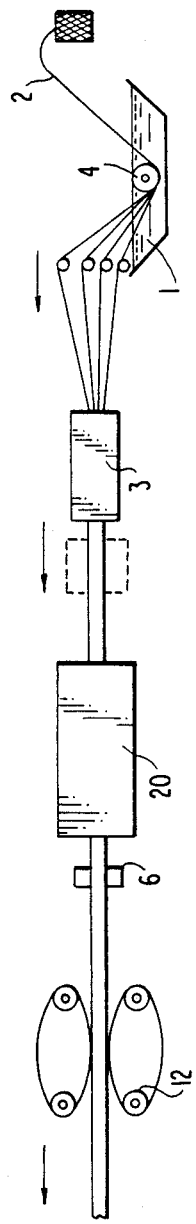
FIG. 4 is view of the state of production in another embodiment of the present invention.

The present invention is described by reference to the following examples.

EXAMPLE 1

FIG. 1 is a view illustrating the production of one embodiment of the present invention.

In the drawing, 1 indicates a resin bath and the inside is filled with a resin solution of an unsaturated polyester resin composition. 2 indicates a glass fiber roving, which is introduced into the resin solution of the above resin tank 1 by means of a roll 4 (by means of a pulling conveyer 12 as described hereinafter), impregnated in the resin solution, and continuously transferred in the arrow direction. 3 indicates a molding die, in which the resin solution in the above resin solution impregnated glass fiber roving 2 is brought into the semi-cured state by heating and at the same time, as shown in FIG. 2, the above resin solution impregnated glass fiber roving 2 is continuously molded into a linear material having a nearly cross-like cross section by means of a die outlet opening 5. 6 indicates a twisting jig comprising a first molding roll 7, a second molding roll 8 and a third molding roll 9, that applies twisting treatment, as shown in the drawing, to the resin impregnated reinforcing fiber in the semi-cured state having passed through the molding die 3. Following the twisting jig, a resin curing furnace 10 (see FIG. 1) is provided, in which the resin is completely cured by applying heat onto the above resin impregnated reinforcing fiber to which the above twisting had been applied. 11 indicates the second twisting jig and, like the above first twisting jig 6, is provided with first to third molding rolls (not shown), provided in a 90° twisted state relative to the above first twisting jig 6, and is designed such that to the resin impregnated reinforcing fiber having passed through the first twisting jig 6, before the resin is completely cured in the above curing furnace 10, further twisting is applied and this twisted state is fixed by the complete curing of the resin in the above curing furnace 10. 12 indicates a pulling conveyor to drive the pultrusion, and is designed such that the fiber reinforced plastics linear material is sandwiched between upper and lower conveyors and pulled in the direction of the arrow direction.

In this manner, as shown in FIG. 3, the fiber reinforced plastic linear material (dimension a is 7 mm) twisted in the circumferential direction to the length direction is continuously obtained and wound on a winding apparatus to produce a product.

EXAMPLE 2

Figure 5:
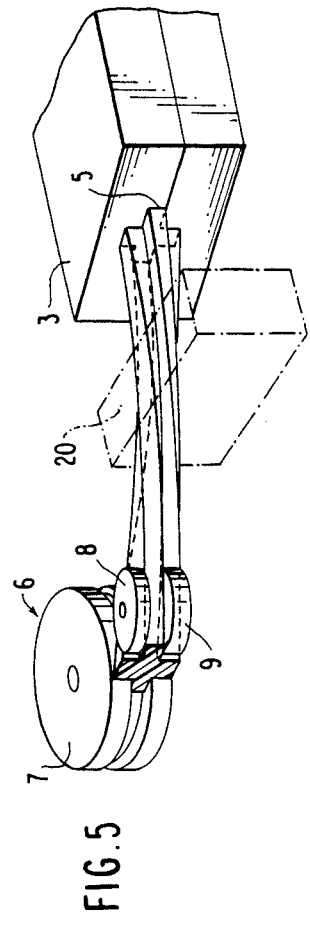
FIG. 5 is a perspective view of a part thereof.

FIGS. 4 and 5 are views illustrating the production according to another embodiment. In this example, a resin impregnated reinforcing fiber is molded by means of a heat molding die 3 and at the same time, the resin is completely cured. It is then passed through a heating furnace 20 maintained at a temperature not lower than Tg of the cured resin, and when it leaves the heating furnace 20, twisting force is applied by means of a twisting jig 6 comprising a first molding roll 7, a second molding roll 8 and a third molding roll 9. Thus to the product in the thus completely cured state was applied the twisting treatment in the 90° twisted state by means of the molding die and the molding jig, and it was set in this state resulting in a fiber reinforced plastics linear material as shown in FIG. 3 that is continuously wound on a winding machine as the final a product. In the above example, molding of the resin impregnated reinforcing fiber and complete curing are conducted at the same time by means of the molding die 3. It is also possible that the resin curing furnace 10 is provided between the molding die 3 and the heating furnace 20, and the material according to the invention is semicured by means of the molding die 3, completely cured in the resin curing furnace 1), and then introduced into the heating furnace 20. Even in a case where it is semicured by means of the molding die, twisting may be applied while completely curing the material in the heating furnace 20 at a temperature of not lower than Tg without providing a resin curing furnace 10.

In the above examples, the curing of the resin is carried out by heating, but it is not limited thereto, and the resin may be cured by irradiation with ultraviolet rays, electron beams and the like. In addition, the twisting may be carried out at predetermined intervals positively and negatively by rotating left the whole of the twisting jig 6 comprising the first to third molding rolls 7 to 9 shown in FIGS. 2 and 5 relative to the direction of transferring the resin and then rotating right. Although in the above examples one or two sets of twisting jigs are used, more than two jigs can be used. It is also possible that the twisting jigs 6, 11 are not used, but rather the pulling conveyor 12 is positioned so that the material is twisted relative to the fiber reinforced plastics linear material, thus using the pulling conveyor itself as a twisting jig. THe fiber reinforced plastic linear material obtained is not limited to one having the cross-sectional form shown in FIG. 3, and those having the cross-sectional views shown in FIGS. 6 to 12 can be produced by appropriately selecting the cross-sectional shape of the molding die. Moreover, it is not limited to the provision of the groove in the spiral form relative to the lengthwise direction of the fiber reinforced plastics linear material as shown in FIGS. 6 to 12 (the numbers in the drawings indicate the dimensions and the unit is mm), and the projection in the form of may be formed. The twisting treatment may be applied to material having crosssectional forms such as an oval, a rectangle, or and the like and a groove or grooves.

In accordance with the process for producing the fiber reinforced plastic linear materials of the present invention, the fiber reinforced plastic linear material can be produced continuously and, therefore, the twisting treatment can be applied without damaging the reinforcing fiber and a fiber reinforced plastic linear material having excellent heat resistance and mechanical strength which is twisted in the circumferential direction can be produced. That is, in accordance with the above method, a continuous filament bundle in the fiber reinforcing linear material is not substantially broken irrespective of the presence of the groove formed. Therefore, the linear material has excellent tensile force in the lengthwise direction and is suitable as a tension member.

One pitch of the spiral such as the groove of the fiber reinforced plastic linear material obtained according to the present invention is usually at least 10 cm and generally about 10 to 100 cm. In particular, when it is used as a tension member for optical fibers, one pitch is about 10 to 100 cm.

The reinforcing fiber content in the fiber reinforced plastic linear materials obtained by the present invention is usually about 45 to 75 vol%. When an inorganic fiber such as glass roving, carbon fiber roving and the like is used as the reinforcing fiber, the reinforcing fiber is in a tensioned state in the cured resin matrix of the linear material obtained, and it is excellent in the tension force in the lengthwise direction.

The fiber reinforced plastic linear materials obtained by the above method is not limited to a tension member and the like for optical fibers, but can be used in other applications such as an agricultural pole, a tension material for concrete and the like. When it is used as a tension member for optical fibers, the optical fiber is placed in the groove and, in general, a plastic tape is wound thereon to produce an optical fiber unit.

The present invention is hereinafter explained in detail by reference to the following Production Examples.

PRODUCTION EXAMPLE 1

A glass roving was used as the reinforcing fiber, and a resin bath was filled with a liquid resin composition prepared by uniformly mixing a vinyl ester resin and benzoyl peroxide. Using the apparatus shown in FIG. 1, a fiber reinforced plastic linear materials was continuously produced at a pulling speed of 1.5 m/min while introducing forcedly a resin impregnated roving into a forming die (while squeezing the liquid resin composition at the inlet of the molding die).

The molding die 3 had a cross-shaped hole in the lengthwise direction, and a length of 500 mm, and was set at a temperature of 80° C. A resin curing furnace (length 1 m) was maintained at 130° C, and a twisting jig as shown in FIG. 5 was provided in the vicinity of the inlet and outlet of the furnace.

Figure 6B:
FIG. 6(a) is a sectional view of another embodiment of the fiber reinforced plastic linear material, and (b) is a broken perspective view thereof.
Figure 6A:
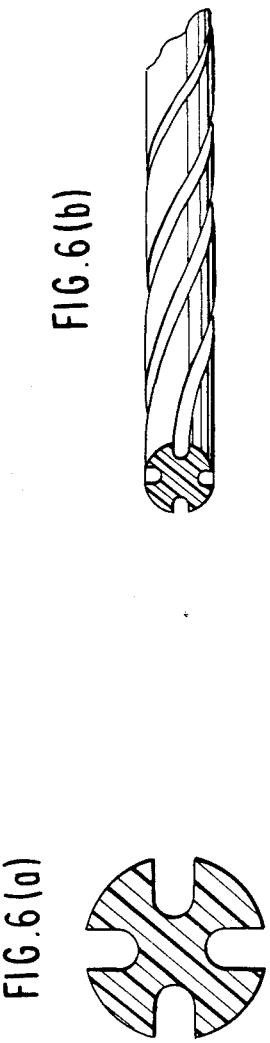

In this example, the semi-cured resin impregnated reinforcing fiber just before entering into the resin curing furnace 10 was twisted in the furnace and completely cured in the furnace, and a fiber reinforced plastic linear materials (one pitch of the groove: 15 cm) having a form shown in FIG. 6 was obtained.

PRODUCTION EXAMPLE 2

A glass roving was used as the reinforcing fiber, and the resin bath was filled with a liquid resin composition prepared by uniformly mixing a vinyl ester resin and benzoyl peroxide. Using the apparatus shown in FIG. 1 (the resin curing furnace 10 was provided), a fiber reinforced plastic linear materials was continuously produced at a pulling speed of 1.0 m/min while forcedly introducing a resin impregnated roving in a molding die.

The molding die 3 had a grooved circular hole in the lengthwise direction and a length of 1000 mm, and set at a temperature of 130° C.

The resin curing furnace 10 (length 2 m) was maintained at 200° C. and the resin was completely cured in the furnace.

The heating furnace 20 (length 1 m) was set at 200° C. (Tg of the resin cured product: 150° C.) and at the same time, the twisting treatment was applied using a twisting jig 6 as shown in FIG. 5 at a position where it left the heating furnace.

According to this method, the completely cured resin impregnated reinforcing fiber is twisted in the heating furnace 20 at a temperature of not lower than Tg to obtain a fiber reinforced plastic linear materials having a form as shown in FIG. 9 (one pitch of the groove: 25 cm).

PRODUCTION EXAMPLE 3

A long polyethylene resin was used as the reinforcing fiber, and the resin bath was filled with a liquid resin composition prepared by uniformly mixing a vinyl ester resin and benzoyl peroxide. Using the apparatus shown in FIG. 1 (the resin curing furnace 10 was provided), a fiber reinforced plastic linear materials was continuously produced at a pulling speed of 1.0 m/min while forcedly introducing the resin impregnated polyethylene fiber in the molding die.

The molding die 3 had a groove forminq circular hole in the lengthwise direction and a length of 500 mm, and set at a temperature of 100° C.

The resin curing furnace (length 2 m) was maintained at 130° C., and the resin was completely cured in the furnace.

The heating furnace 20 (length 2 m) was set at 150° C. (the melting point of the polyethylene fiber: 110° C.), and at the same time, a twisting jig as shown in FIG. 16 was twisted using a twisting treatment was applied using a twisting jig as shown in FIG. 5 at a position where it left the heating furnace.

In accordance with this method, the completely cured resin impregnated reinforcing fiber was twisted in the heating furnace 20 at a temperature not lower than the melting point (110° C.) of the polyethylene fiber to obtain a fiber reinforced plastic linear materials (one pitch of the groove: 15 cm) having a form as shown in FIG. 9.

We claim:

1. A process for producing a fiber reinforced, linear, plastic material which comprises the steps of:
   (1) continuously moving reinforcing fiber lengthwise;
   (2) impregnating said fiber of step (1) with a resin;
   (3) shaping and semi-curing said resin impregnated fiber of step (2) into fiber reinforced, linear plastic material having at least one lengthwise groove;
   (4) twisting said fiber reinforced, linear plastic material of step (3); and
   (5) completely curing said twisted, fiber reinforced, linear plastic material of step (4).

2. The process claimed in claim 1, wherein said step (3) of shaping and semi-curing takes place in a heated molding die.

3. The process claimed in claim 1, wherein said step (4) of twisting said shaped and semi-cured, fiber reinforced, linear plastic material takes place in a twisting jig.

4. The process claimed in claim 1, wherein said step (5) of completely curing said twisted, fiber reinforced, linear plastic material takes place in a resin curing furnace.

5. The process claimed in claim 1 wherein said reinforcing fiber is glass fiber roving.

6. A process for producing a fiber reinforced, linear, plastic material which comprises the steps of:
   (1) continuously moving reinforcing fiber lengthwise;
   (2) impregnating said fiber of step (1) with a resin;
   (3) shaping and semi-curing said resin impregnated fiber of step (2) into fiber reinforced, linear plastic material having at least one lengthwise groove;
   (4) completely curing said shaped and semi-cured fiber reinforced, linear plastic material of step (3);
   (5) passing and simultaneously twisting said completely cured fiber reinforced, linear plastic material of step (4) through a heating zone.

7. The process claimed in claim 6, further comprising the step of:
   (6) maintaining said heating zone of step (5) at a temperature not lower than the glass transition temperature of said completely cured fiber reinforced, linear plastic material.

8. The process claimed in claim 6, further comprising the step of:
   (6) maintaining said heating zone of step (5) at a temperature not lower than the melting point of said completely cured fiber reinforced, linear plastic material.

9. The process claimed in claim 6, wherein said step (3) of shaping and semi-curing takes place in a heated molding die.

10. The process claimed in claim 6, wherein said step (5) of passing and simultaneously twisting said completely cured fiber reinforced, linear plastic material takes place in a twisting jig.

11. The process claimed in claim 6, wherein said step (4) of completely curing said shaped and semi-cured reinforced, linear plastic material takes place in a resin curing furnace.

12. The process claimed in claim 6 wherein said reinforcing fiber is glass fiber roving.

* * * * *